June 5, 1928.  
J. A. H. HOV  
1,672,065  
MACHINE FOR DISTRIBUTING ARTIFICIAL MANURE AND THE LIKE  
Filed Aug. 12, 1925
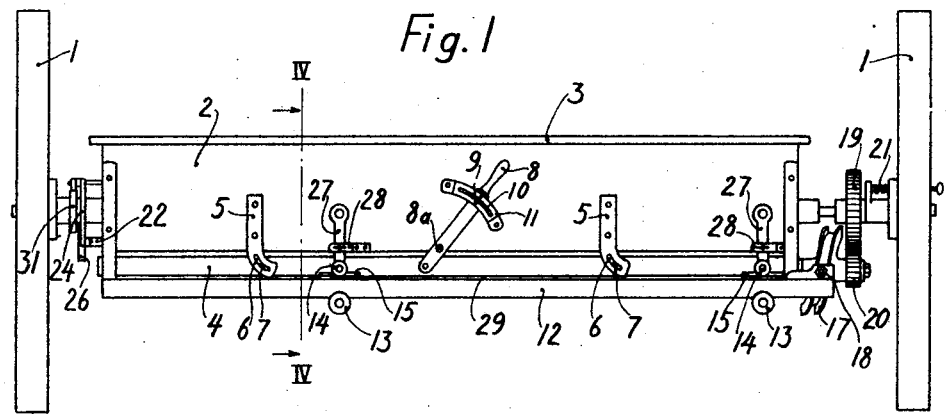
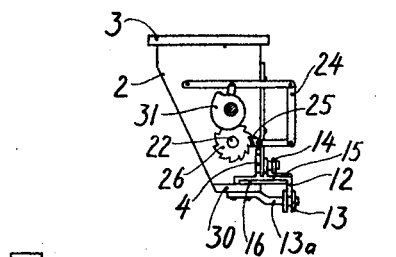
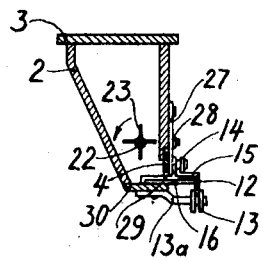
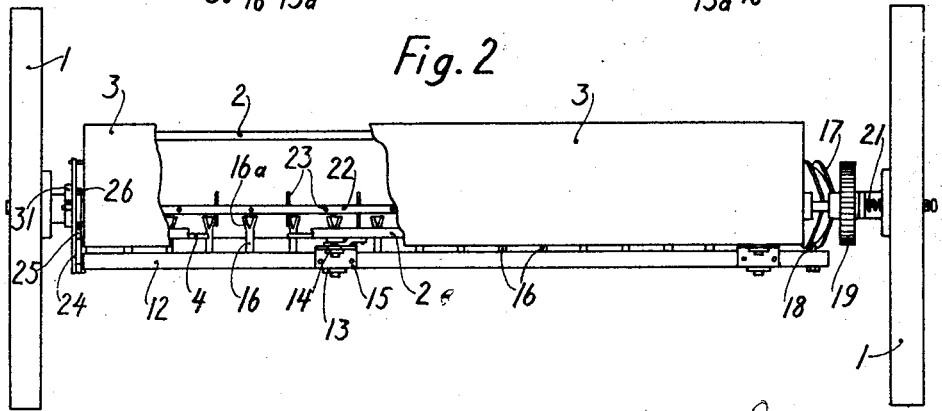

Patented June 5, 1928.

1,672,065

UNITED STATES PATENT OFFICE.

JOHAN ARNT HANSEN HOV, OF TRONDHJEM, NORWAY.

MACHINE FOR DISTRIBUTING ARTIFICIAL MANURE AND THE LIKE.

Application filed August 12, 1925. Serial No. 49,866.

The present invention relates to a machine for distributing artificial manure of the kind, wherein a rod reciprocating along the manure container or hopper is provided with fixed fingers projecting into the container and feeding out the manure from the same during the motions of the rod.

The invention consists in the combination of parts as set forth in the claim. In accordance therewith the said fingers are provided with dovetailed-shaped inner ends and of such a thickness as to force the manure out towards the discharging slit irrespective of the consistency of the manure. The slit is confined at one side by a lath which may be adjusted by means of suitable inclined guides so as to be raised or lowered and thereby to increase or decrease correspondingly the discharging slit. The reciprocating motion of the finger rod is brought about in well-known manner by means of a cam disc, and the correct guiding of the rod is effected by means of rolls or similar guiding members.

A suitable construction of the said cam disc is obtained by making it as an oblique, shiftable, grooved wheel which according to requirements may be operatively coupled to one of the travelling wheels of the machine. Thereby a simple construction is obtained, because members between the cam disc and the finger rod are avoided.

Experience has shown that by this construction it is possible to obtain a safe feeding-out of artificial manure such as Norgessalpeter which is liable to bake together into lumps and which therefore cannot be distributed by other machines.

A preferred embodiment of the machine is illustrated in the accompanying drawing in which:

Fig. 1 is an end elevation of the machine constructed in accordance with the invention.

Fig. 2 is a plan view of the machine, parts of the manure container broken away.

Fig. 3 is an end view of the machine, the travelling wheels being removed, and

Fig. 4 is a cross section on the line IV—IV of Figure 1.

Referring to the drawing, the travelling wheels are shown at 1, the manure container or hopper at 2, its cover at 3 and its bottom at 30. At the lower part of the said container a discharging slit 29 is arranged so as to open laterally over the free outer edge of the bottom 30 as clearly shown in Figure 4, whereby the manure when fed out from the bottom will be able to fall to the ground without meeting any obstruction and without being subjected to any baking tendency. The said slit is confined between the bottom 30 and an adjustable lath 4. In order to enable the raising and lowering of the lath the container is provided with mountings 5 having inclined slits 6 into which pins 7 attached to the lath project. A handle 8 is by means of a pin 8ª pivotally connected with the container or other stationary part of the machine frame. By means of this handle the lath can be adjusted longitudinally and vertically, whereby the lath, on account of the slits 6, will be raised or lowered thereby adjusting the width of the discharging slit 29 correspondingly. The handle 8 may be fixed in adjusted position by means of a screw 9 the shank of which passes through a curved slit 10 arranged in a guiding arc 11.

A reciprocating angle iron rod 12 is supported by rolls 13 carried by projecting arms 13ª fixedly connected with the container bottom 30. Said rod 12 is guided on its upper side by rolls 14 engaging mountings 15 on the upper side of the rod. Further the rod 12 carries a row of fingers 16 projecting horizontally through the lateral slit 29 into the manure container just above the bottom 30. The inner ends are shaped like dovetails as clearly shown in Figure 2. The side edges of the dovetailed portions are inclined as shown at 16ª.

The reciprocating motion of the finger rod 12 is effected by an oblique grooved wheel 17 in mesh with a pin 18 attached to the rod. The said wheel is driven by a gearing 19, 20 from one of the travelling wheels 1, when the spur gear 19 by means of a suitable connecting member 21 has been coupled with the travelling wheel. By these means the rod 12 receives a rectilinear longitudinal motion which is essential in order to avoid baking.

A stirring shaft 22 is provided with tines 23 and arranged above the dove-tailed ends of the feeding-out fingers 16. The stirring shaft 22 is driven from the other travelling wheel 1 by means of a ratchet gear comprising a leverage 24 receiving by means of a cam disc 31 on the travelling wheel a certain swinging motion on each revolution of the wheel, said motion being by the leverage 24 and a pawl 25 transferred into an angular motion of the ratchet wheel 26 keyed to the stirring shaft 22.

In the construction shown the guiding rolls 14 are carried by arms 27 which may be swung so that the rolls 14 are carried out of contact with the finger rod 12, but when in operation they are maintained in position by a suitable locking device 28. The purpose of this arrangement is to enable an easy removing of the finger or feeding rod 12 when the manure container 2 and the feeding members 16, 23, 22 are to be cleaned.

As will be understood the invention is not restricted to the details shown which may be varied in different manner without departing from the scope of the invention.

I claim:

In a machine for distributing artificial manure, the combination of a manure container having a horizontal lateral discharging slit, a rectilinearly reciprocating horizontal rod arranged along the slit and having a downwardly extending longitudinal flange spaced from the container, fingers attached to the rod and projecting through the lateral slit into the container, said fingers serving at each stroke of the rod to feed outwards the manure located between the fingers, grooved supporting rollers mounted at the lower side of the container and on which said flange of the rod bears, arms mounted on the container for swinging movement and having rollers to bear on the upper side of said rod and means to lock said arms against swinging movement and means to regulate the discharge of material from the container.

In testimony whereof I affix my signature.

JOHAN ARNT HANSEN HOV.